(12) United States Patent
Burugupalli et al.

(10) Patent No.: US 10,531,507 B2
(45) Date of Patent: Jan. 7, 2020

(54) LINK BUDGET ESTIMATION ON COMPANION DEVICE

(71) Applicant: APPLE INC., Cupertino, CA (US)

(72) Inventors: Srinivas Burugupalli, Union City, CA (US); Vijay Kumar Ramamurthi, Milpitas, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/889,599

(22) Filed: Feb. 6, 2018

(65) Prior Publication Data
US 2019/0246439 A1 Aug. 8, 2019

(51) Int. Cl.
*H04W 76/15* (2018.01)
*H04W 24/10* (2009.01)
*H04W 24/02* (2009.01)
*H04W 88/06* (2009.01)

(52) U.S. Cl.
CPC ........... *H04W 76/15* (2018.02); *H04W 24/02* (2013.01); *H04W 24/10* (2013.01); *H04W 88/06* (2013.01)

(58) Field of Classification Search
None
See application file for complete search history.

(56) References Cited

U.S. PATENT DOCUMENTS

| 2017/0006117 A1* | 1/2017 | Kafle | H04W 76/11 |
| 2018/0132159 A1* | 5/2018 | Strong | H04L 45/00 |

* cited by examiner

*Primary Examiner* — Mohammed Rachedine
(74) *Attorney, Agent, or Firm* — Fay Kaplun & Marcin, LLP

(57) ABSTRACT

A device, system, and method estimate a link budget on a companion device. The method is performed at a first device connecting to a second device over a first connection and a network over a second connection, the second device connecting to the network over a third connection. The method includes receiving initiating data from the second device based on radio conditions associated with the third connection. The method includes, when the first device disconnects from the second device and establishes the second connection, determining an initial network metric value based on the initiating data that is used to estimate radio conditions associated with the second connection. The method includes selecting a data exchange mode of the first device based on the initial network metric value which is used until a further network metric is determined by the first device.

22 Claims, 4 Drawing Sheets

LINK BUDGET ESTIMATION ON COMPANION DEVICE

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., a Long Term Evolution (LTE) network) to communicate with another UE through the network connection (e.g., a user of the UE may perform a voice call or transmit a text to another user of another UE). In another example, the UE may connect to a second type of network (e.g., a WiFi network) to receive browser data at a higher rate of data exchange. In a further example, the UE may directly connect to a further UE using a short-range communication protocol (e.g., BlueTooth). When using this short-range communication protocol, the two UEs may be in a companion relationship where one of the UEs is a companion UE and the other one of the UEs is an accessory UE. While connected to one another, the accessory UE may be connected to one or more networks via the companion UE. However, when not connected to each other, each UE may also be configured to independently connect to one or more networks.

When the accessory UE is not connected to the companion UE, the accessory UE may perform a plurality of initialization operations. For example, the accessory UE may perform network association operations and initialize network capabilities for applications that are executed on the accessory UE. However, the accessory UE may not have information upon which to determine a level of the network capabilities. By being blind when going to a standalone mode, the accessory UE may not have, for example, an initial link quality metric (LQM) value used to determine radio conditions. Using an arbitrary default LQM value (e.g., a medium radio condition) while the accessory UE is experiencing poor radio conditions, the accessory UE may allow the applications to attempt to exchange data with the network which may result in increased power usage and a poor user experience. However, using a default LQM value corresponding to poor radio conditions when the accessory UE may actually have better radio conditions may prevent the applications from attempting to exchange data with the network which may create delays and result in a poor user experience.

SUMMARY

The exemplary embodiments are directed to a method, comprising: at a first device that is configured to establish a device connection to a second device over a first connection and a network connection to a network over a second connection, the second device configured to establish a further network connection to the network over a third connection: receiving initiating data from the second device over the first connection, the initiating data based on radio conditions associated with the third connection of the second device; when the first device disconnects from the second device and establishes the second connection, determining an initial network metric value based on the initiating data, the initial network metric value used to estimate radio conditions associated with the second connection of the first device; and selecting a data exchange mode of the first device based on the initial network metric value, the selected data exchange mode being used until a further network metric is determined by the first device.

The exemplary embodiments are directed to a device, comprising: a transceiver configured to establish a device connection to a further device over a first connection and a network connection to a network over a second connection, the further device configured to establish a further network connection to the network over a third connection, the transceiver configured to receive initiating data from the second device over the first connection, the initiating data based on radio conditions associated with the third connection of the further device; and a processor determining an initial network metric value based on the initiating data when the device disconnects from the further device and establishes the second connection, the initial network metric value used to estimate radio conditions associated with the second connection of the device, the processor selecting a data exchange mode of the device based on the initial network metric value, the selected data exchange mode being used until a further network metric is determined by the device.

The exemplary embodiments are directed to a method, comprising: at a first device that is configured to establish a device connection to a second device over a first connection and a network connection to a network over a second connection, the second device configured to establish a further network connection to the network over a third connection: determining radio conditions associated with the second connection of the first device; determining a quality of the first connection; determining initiating data based on the radio conditions and the quality; and transmitting the initiating data to the second device over the first connection, wherein the initiating data is used by the second device upon disconnecting from the first device and establishing the second connection, the initiating data used to select a data exchange mode of the second device until a further network metric is determined by the second device.

DETAILED DESCRIPTION

Figure 1:
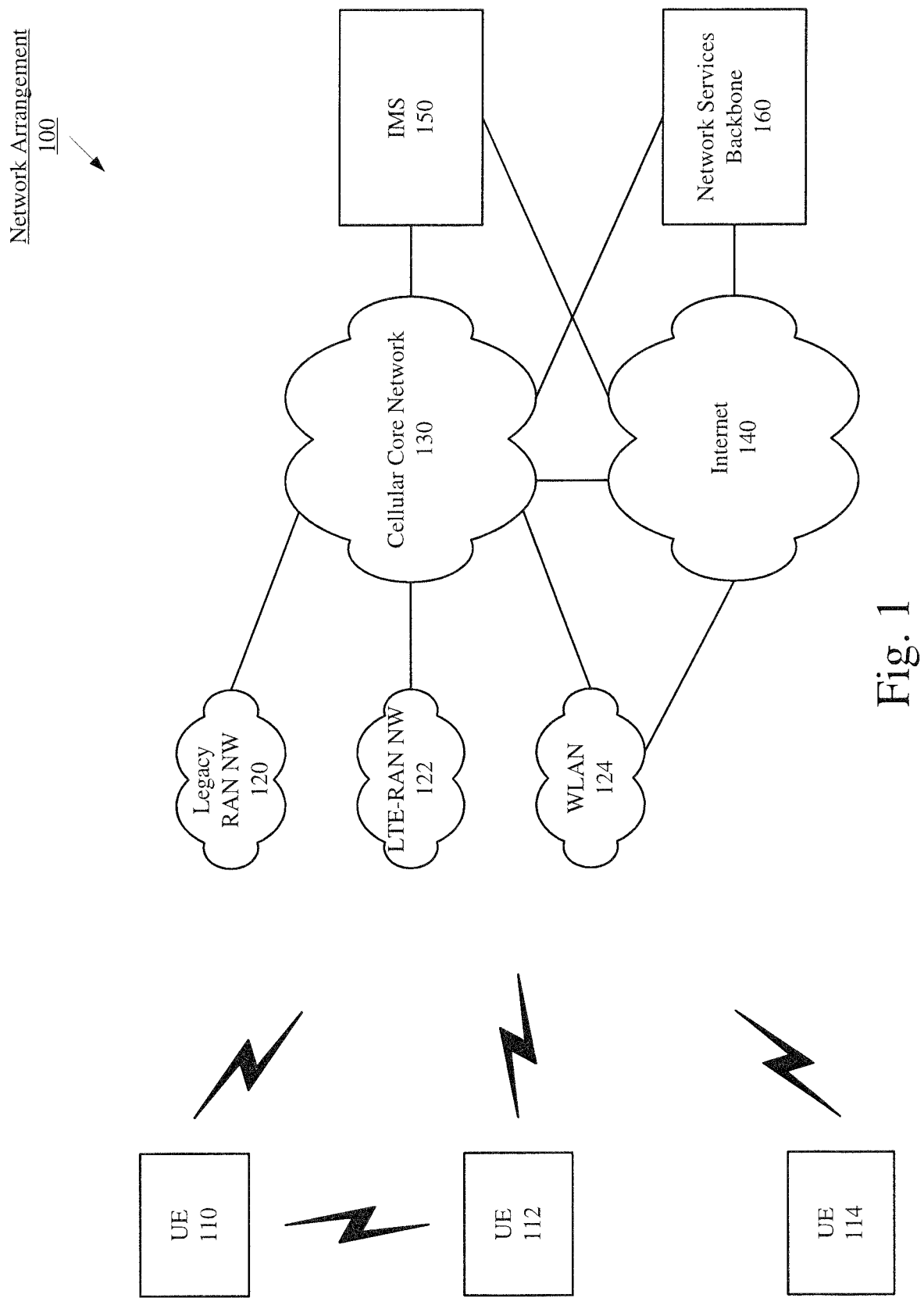
FIG. 1 shows an example network arrangement according to various exemplary embodiments described herein.

The exemplary embodiments may be further understood with reference to the following description and the related appended drawings, wherein like elements are provided with the same reference numerals. The exemplary embodiments are related to a device, system, and method for dynamically selecting an initial mode in which to enable network capabilities for applications being executed on a user equipment (UE). Specifically, the UE may be a first UE in a companion relationship with a second UE, the first UE being the accessory UE and the second UE being the companion UE when the first and second UEs are connected to one another.

The exemplary embodiments are directed to operations performed while the first and second UEs are connected to one another and selecting the initial mode for the first UE when the first and second UEs become disconnected from one another. As will be described in further detail below, the first UE may select the initial mode based on estimated radio conditions as a function of radio conditions of the second UE.

Initially, it is noted that the exemplary embodiments are described with regard to a UE. However, the UE is only exemplary. The exemplary embodiments may be utilized with any device that may establish a connection to one or more networks and one or more further UEs as well as configured with the hardware, software, and/or firmware to establish these connections. Therefore, the UE as described herein is used to represent any device capable of establishing a connection to both another device and at least one network.

It is also noted that the exemplary embodiments are described to include scenarios in which the UE has a companion UE where the UE is an accessory and the companion UE is a companion or vice versa. Accordingly, when the UE and the companion UE are connected to one another over a short-range communication pathway, the UE may receive data via the companion UE while deactivating any network capabilities to a cellular network and/or a WiFi network. When the UE and the companion UE are not connected, the UE may exchange data over any network to which it is configured to connect (instead of through the companion UE). However, the use of the UE and the companion UE is only exemplary. The exemplary embodiments may be utilized for any UE (with or without a companion UE or a companion relationship) and represent any device. Furthermore, for illustrative purposes, the exemplary embodiments are described with regard to the UE attempting to establish a connection with a network when the short-range communication pathway between the UE and the companion UE is no longer available.

A UE in a companion relationship with another UE may be configured with a plurality of operating modes. A first operating mode may be a companion mode when the UE is connected to the companion UE. While connected to the companion UE, the companion UE may perform all data exchanges with any connected networks. For example, a text messaging application may be running on the UE and the companion UE. Using a network connection that the companion UE has established, a text message may be received by the companion UE. The companion UE may transmit data associated with the text message to the UE over the short-range communication pathway for the text message to be displayed on the UE. In this manner, any network related operation of an application running on the UE may be performed on the companion UE. Accordingly, a baseband processor and associated functionalities for communicating with any network may be deactivated on the UE while the connection to the companion UE is established.

A second operating mode may be a standalone mode when the UE is not connected to another UE, particularly the companion UE. For example, the UE may have been activated and the companion UE is unavailable. In another example, the UE may have terminated the companion mode and entered the standalone mode due to the companion UE being unavailable. When the baseband processor and the associated network functionalities of the UE (hereinafter "baseband features") are activated, the UE may perform initial operations to connect to a network and exchange data over the network. As those skilled in the art will understand, upon activation and after a duration of time, the UE may utilize measurements of network metrics to select a data exchange mode that determines how data is to be exchanged with the network. For example, the measurements may indicate a relatively strong radio condition. In a particular manner, the UE may use a Link Quality Metric (LQM) value that is based on the measured network metrics (e.g., as included in a Link Quality Report indicating packets of data that are sent, received, rejected, etc.). With a strong radio condition, the UE may use a first data exchange mode (e.g., data rate, modular and coding scheme, etc.) that allows applications running on the UE to exchange data. In another example, when the measurements indicate a relatively poor radio condition, the UE may use a second data exchange mode that selectively allows or prevents the applications to exchange data, particularly transmit data.

The UE may utilize measurements to determine a data exchange mode once the measurements are available. However, the UE may not have measurements or have an insufficient amount of measurements to determine the data exchange mode when the baseband features are initially activated. That is, when the baseband features are first initialized, the UE is blind upon entering the standalone mode. Accordingly, the UE may not be aware of the initial LQM value to use. To eventually arrive at an accurate LQM value upon which to determine the data exchange mode, the UE may require a certain amount of time. Those skilled in the art will understand that arriving at the accurate LQM value may require at least 20 seconds (e.g., each LQM measurement may take approximately 1.28 seconds based on network operation windows and the minimum number of LQM measurements to reach the LQM value may be more than 10). Thus, once other network operations are performed to connect to the network and initialize the baseband features (e.g., waking the baseband processor, connecting to a base station of a network, camping on a cell, etc.), the operation to determine the LQM value is subsequently performed such that the process may take more than 30 seconds or even up to 1 minute.

Although the process to ultimately determine the data exchange mode may require some time once the UE enters the standalone mode and connects to the network (but prior to determining the data exchange mode), applications running on the UE that utilize the network connection may attempt to utilize the network connection to exchange data immediately. To address the immediate reaction by the applications, the UE may select a default LQM value or a default data exchange mode. For example, an intermediary LQM value and a corresponding intermediary data exchange mode may be selected. When the UE actually has a poor radio condition, the intermediary data exchange mode may result in increased data exchange failures and subsequent operations (e.g., retransmissions). Thus, the applications attempting to reach respective servers via the network may lead to excessive radio communications in potentially poor radio conditions, which are detrimental to battery performance and user experience.

In view of the above initiating scenario when the UE enters the standalone mode, the exemplary embodiments provide a mechanism to dynamically determine the data exchange mode using an estimated LQM value (rather than a default LQM value) that has an increased probability of being accurate for the radio conditions being experienced by the UE when entering the standalone mode after terminating the companion mode. As will be described in further detail below, the companion mode may be used by the companion UE to provide radio data for the estimated LQM value to be determined. The radio data may be based on the radio conditions being experienced by the companion UE. Since the UE and the companion UE are likely to have similar radio conditions (e.g., since the companion relationship uses a short-range communication pathway meaning that the two UEs should be relatively close to each other), the UE may enter the standalone mode from the companion mode in a substantially similar radio condition that the companion UE is experiencing when the radio data was last provided. The UE may therefore determine the data exchange mode based on the estimated LQM value as a function of the radio data.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearable devices, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network), a LTE RAN (LTE-RAN) 122, and a wireless local area network (WLAN) 124 (e.g., a WiFi network). However, it should be understood that the UEs 110-114 may also communicate with other types of networks (e.g., 5G networks). With regards to the exemplary embodiments, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is an accessory and the UE 112 is a companion. Thus, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway. It is also again noted that the exemplary embodiments are described with regard to a network connection to one of the legacy RAN 120, the LTE-RAN 122, or the WLAN 124. When the companion relationship is used, it may be assumed that the UEs in the companion relationship are utilizing the short-range communication protocol (e.g., separated from one another) and the companion is connected to one of the networks 120-124 while the accessory is only connected to the companion.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, gNBs, etc.) that are configured to send and receive traffic from UEs that are equipped with the appropriate cellular chip set. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
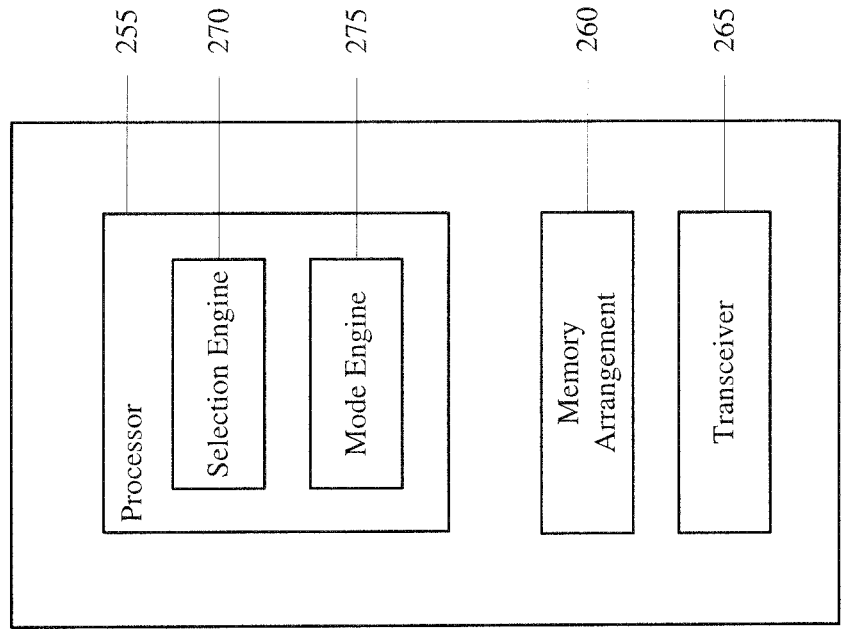
FIG. 2 shows an example companion relationship of user equipments according to various exemplary embodiments described herein.
Figure 2:
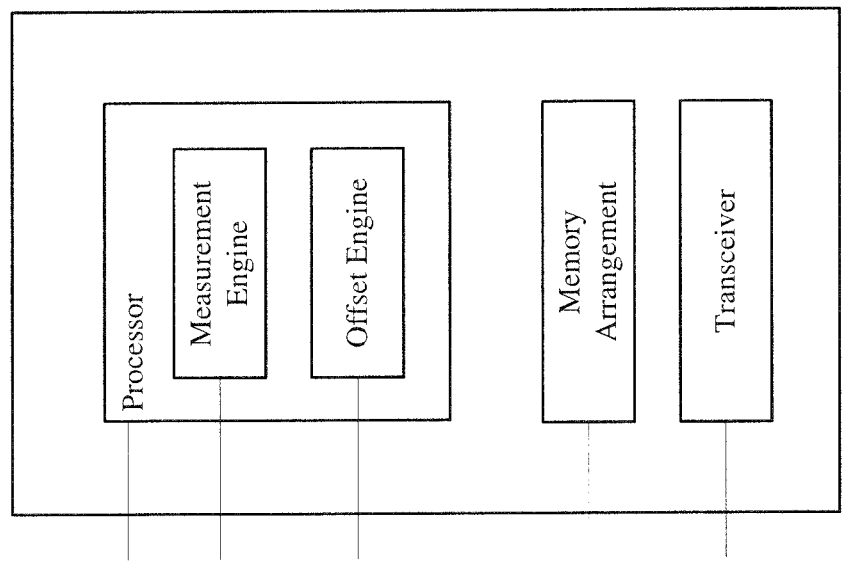

The exemplary embodiments relate to the UE 110 receiving radio data from the UE 112 while the UEs 110, 112 are connected to one another over the short-range communication pathway. The UE 112 may generate the radio data as an offset and the UE 110 may determine a LQM value based on this offset that is used in determining a data exchange mode that is to be used when the UE 110 enters the standalone mode until an accurate LQM value is determined from measurements performed by the UE 110. FIG. 2 shows an example companion relationship including the UEs 110, 112 that may be used to provide the features of the exemplary embodiments. The UEs 110, 112 are configured to execute a plurality of applications that perform functionalities in initializing the baseband features of the UE 110 when terminating the companion mode and entering the standalone mode.

It is noted that the use of the LQM value is only exemplary. As noted above, the LQM value may be based on data exchanges (e.g., transmissions and receptions) that are successfully transmitted, successfully received, rejected, failed, re-transmission attempts used, etc. Thus, the LQM value may be based on objective data exchange statistics gathered over a period of time from using a particular network connection. However, the exemplary embodiments may also utilize other types of network metrics and measurements. For example, the exemplary embodiments may use a received signal strength indicator (RSSI), a reference signal received quality (RSRQ), a reference signal received power (RSRP), a signal to noise ratio (SNR), a power attenuation, a power headroom, a combination thereof, etc.

The UEs 110, 112 may represent any electronic device that is configured to perform wireless functionalities and may be representative of one or more of the UEs 110-114 (examples of which are noted above). As noted above, the UEs 110, 112 may be configured to utilize a companion relationship in which the UE 110 may be the accessory and the UE 112 may be the companion. The UEs 110, 112 may each include a plurality of components. As illustrated, the UE 112 may include a processor 205, a memory arrangement 210, and a transceiver 215. The UE 110 may include a processor 255, a memory arrangement 260, and a transceiver 265. However, each of the UEs 110, 112 may include further components such as, for example, a display device, an input/output (I/O) device, an audio input device, an audio output device, a battery that provides a limited power supply, a data acquisition device, ports to electrically connect the UEs 110, 112 to other electronic devices, etc.

It is again noted that the UEs 110, 112 being in the companion relationship is only exemplary. When using the companion relationship, the accessory UE 110 may be connected to the companion UE 112 while the accessory UE 110 has deactivated the network capabilities and the companion UE 112 has established a network connection. When not using the companion relationship, the UE 110 may activate the network capabilities and establish a network connection. Without using the companion relationship, the UEs 110, 112 may still utilize the above noted connections to one another and to the networks and be provided the features of the exemplary embodiments.

With regard to the UE 112, the processor 205 may be configured to execute a plurality of engines of the UE 112. For example, the engines may include a measurement engine 220 and an offset engine 225. The measurement engine 220 may be configured to measure network metrics and determine a LQM value of the UE 112 or determine the radio conditions of the UE 112. The offset engine 225 may be configured to utilize the output of the measurement engine 220 and determine an offset that the UE 110 is to use in generating an estimated initial LQM value upon entering the standalone mode from the companion mode.

It should be noted that the above noted engines each being an application (e.g., a program) executed by the processor 205 is only exemplary. The functionality associated with the engines may also be represented as a separate incorporated component of the UE 112 or may be a modular component coupled to the UE 112, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with network metrics and measurements used in determining the offset. The transceiver 215 may be a hardware component configured to establish a connection with at least one of a base station associated with the legacy RAN 120, a base station of the LTE-RAN 122 (e.g., an evolved Node B (eNB)), a router of a WLAN 124, the UE 110, etc. Accordingly, the transceiver 215 may operate on a variety of different frequencies or channels (e.g., set of consecutive frequencies). The transceiver 215 may also be used to establish the short-range communication pathway when the UE 112 is in the companion mode with the UE 110. Accordingly, the transceiver 215 may operate on a corresponding frequency or channel (e.g., Bluetooth).

As described above, the measurement engine 220 may measure network metrics and determine a LQM value of the UE 112 or determine the radio conditions of the UE 112. The measurement engine 220 may use any mechanism in which to take measurements or track data exchanges to determine the LQM value. The measurement engine 220 may also use any time frame in which the LQM value may be determined. For example, as noted above, a time duration of approximately 20 seconds may be used to arrive at an accurate LQM value.

The measurement engine 220 may be configured to determine the LQM value at various time intervals. The measurement engine 220 may continuously gather the measurements associated with the data exchanges. Thus, in a first example, the measurement engine 220 may generate the LQM value at predetermined time intervals. In a second example, the measurement engine 220 may generate the LQM value when an event has occurred (e.g., a change to the measurements beyond a predetermined threshold). In a third example, the measurement engine 220 may generate the LQM value only when the short-range communication pathway is established between the UEs 110, 112.

The offset engine 225 may utilize the output of the measurement engine 220 and determine an offset that the UE 110 is to use in generating an estimated initial LQM value upon entering the standalone mode from the companion mode. The offset engine 225 may be configured to determine the quality of the short-range communication pathway between the companion UE 112 and the UE 110. Thus, the offset engine 225 may receive connection metrics with regard to this connection. The offset engine 225 may also determine how the quality of the short-range communication pathway alters a relative radio condition between the UEs 110, 112. For example, the quality may be used as a basis on which the offset engine 225 determines an amount that the radio conditions of the UE 112 should be offset to estimate the radio conditions of the UE 110. Thus, according to the exemplary embodiments, the LQM value of the companion UE 112 may include valid information that may be used to seed the initial LQM value of the UE 110 to determine the data exchange mode of the UE 110 prior to arriving at an accurate LQM value that is calculated by the UE 110.

The offset engine 225 may be configured to utilize a dynamic generated formula in which the LQM value from the measurement engine 220 provides an input for a variable of the formula. For example, multiplying/dividing factors (e.g., applied to the variable) and/or addition/subtraction constants may be dynamically selected. The formula may be determined based on the available information of the UE 110. For example, the offset that is determined using the formula may be related to the quality of the short-range communication pathway of the UEs 110, 112. In a first example, when the quality is strong, the formula may be configured to generate an offset that is minimal because the radio conditions of the UE 110 may have a high probability of being substantially similar to the radio conditions of the companion UE 112. In a second example, when the quality is poor, the formula may be configured to generate an offset that is relatively high because the radio conditions of the UE 110 may have a probability of being different than the radio conditions of the companion UE 112. There may also be an underlying assumption that, with all environmental factors being equal, the UE 110 is understood to have, at best, the same radio conditions as the companion UE 112. For example, due to less sophisticated components and form factor reasons, the UE 110 may not be capable of having better radio conditions. However, this assumption is only exemplary and there may exist scenarios where the UE 110 may have better radio conditions than the UE 112. The exemplary embodiments may be configured to address when this occurs as well.

It is noted that the formula used to determine the offset based on the LQM value from the measurement engine 220 may utilize a different factor or incorporate additional factors beyond the quality of the short-range communication pathway between the UEs 110, 112. For example, the formula may also utilize factors such as frequency, antenna attenuation, etc. It is also noted that the short-range communication pathway may be used to provide capability information of the UE 110 to the companion UE 112 such that the offset may be determined more accurately. The capability information of the UE 110 may relate to fixed capability information (e.g., hardware limitations) as well as dynamic capability information (e.g., based on current conditions).

The offset engine 225 may be configured to determine the offset at various time intervals. The offset engine 225 may receive the LQM value and continuously gather the information used to generate the result of the formula. Thus, in a first example, the offset engine 225 may generate the offset at predetermined time intervals. In another example, the offset engine 225 may generate the offset when an event has occurred (e.g., a change to the LQM value beyond a predetermined threshold, a change in the quality of the short-range connection, etc.). In a further example, the offset engine 225 may generate the offset only when the short-range communication pathway is established between the UEs 110, 112.

It is noted that the exemplary embodiments are described herein with the companion UE 112 performing the operations to determine the offset. However, the exemplary embodiments may also be configured for the offset engine 225 and the functionalities thereof to be performed by the UE 110. Thus, in the implementation where the UE 110 includes the offset engine 225, the companion UE 112 may transmit the LQM value as determined by the measurement engine 220 to the UE 110 over the short-range communication pathway. The companion UE 112 may also transmit capability information and/or other information to the UE 110 over the short-range communication pathway that is used by the offset engine 225 to determine the offset. However, for illustrative purposes, the exemplary embodiment described above in which the offset engine 225 is included in the companion UE 112 is continued with the description of the UE 110 herein.

With regard to the UE 110, the processor 255 may be configured to execute a plurality of engines of the UE 110. For example, the engines may include a selection engine 270 and a mode engine 275. The selection engine 270 may be configured to receive the offset from the companion UE 112 and determine the data exchange mode that is to be used initially upon the UE 110 entering the standalone mode. The mode engine 275 may be configured to utilize the output of the selection engine 270 and set the corresponding mode in which applications are to perform data exchanges. The UE 110 may include further engines. For example, the UE 110 may include a substantially similar engine as the measurement engine 220 to determine a LQM value. Once the LQM value is sufficiently accurate for the UE 110, the data exchange mode may be modified accordingly and the temporarily set data exchange mode based on the features of the exemplary embodiments may be replaced. In another example, the UE 110 may include a plurality of applications that may be running on the UE 110. These applications may be one or more user applications (e.g., a phone application, a browser application, a text messaging application, a user monitoring application, etc.), one or more background applications (e.g., a network processing application, an operating system, etc.), etc.

It should be noted that the above noted engines each being an application (e.g., a program) executed by the processor 255 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 255 is split among two processors, a baseband processor and an applications processor, as will be described in further detail below. The exemplary embodiments may be implemented in any of these or other configurations of a UE.

The memory 260 may be a hardware component configured to store data related to operations performed by the UE 110. As will be described in further detail below, the memory 260 may store data received from the companion UE 112 over the short-range communication pathway and other network metrics and measurements used in determining a data exchange mode to be used by the UE 110. The transceiver 265 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 265 may operate on a variety of different frequencies or channels (e.g., set of consecutive frequencies). The transceiver 265 may also be used to establish the short-range communication pathway when the UE 110 is in the companion mode with the UE 112. Accordingly, the transceiver 265 may operate on a corresponding frequency or channel (e.g., Bluetooth).

As described above, the selection engine 270 may receive the offset from the companion UE 112 and determine the data exchange mode that is to be used initially upon the UE 110 entering the standalone mode. The selection engine 270 may be configured to determine certain conditions and/or settings of the UE 110 in performing its functionality. For example, the selection engine 270 may determine whether the UE 110 is in the companion mode and the short-range communication pathway is still established. As noted above, when the UE 110 is in the companion mode, the UE 110 may have deactivated the baseband features and is relying on the short-range communication pathway for any network operations that are being performed on the companion UE 112. When the selection engine 270 determines that the UE 110 is in the companion mode, the selection engine 270 may receive and store the offset from the companion UE 112 but not proceed further. When the selection engine 270 determines that the UE 110 is in the standalone mode, the selection engine 270 may retrieve the most current offset that was received from the companion UE 112 for further processing.

In an exemplary implementation, the processor 255 of the UE 110 may include an applications processor which includes a memory component. Specifically, the memory component of the applications processor may be a code telephony (CT) module. This CT module may be situated above the baseband operations level. As those skilled in the art will understand, the CT module may be configured to store information for network related functionalities. The information may be of any kind including network aspects determined by the UE 110, network aspects received from a network server, network aspects received from further devices, etc. Accordingly, the information stored in the CT module may include the offset that is received from the companion UE 112.

The offset engine 270 may also determine an estimated initial LQM value that is to be used. In determining the estimated initial LQM value, the offset engine 270 may be configured with a default LQM value. The default LQM value may be set to a value that corresponds, for example, to medium radio conditions. It is noted that the default LQM value may also be set to a value that corresponds to other radio conditions. Using the default LQM value, the offset engine 270 may apply the offset received from the companion UE 112. For example, with a poor quality of the short-range communication pathway, the offset may be relatively large. Thus, the default LQM value may be modified with this offset and result in an estimated initial LQM value that corresponds to poor radio conditions. In another example, with a strong quality of the short-range communication pathway, the offset may be relatively small or zero. Thus, the default LQM value may be modified with this offset and result in an estimated initial LQM value that corresponds to medium radio conditions. In one example, the LQM may be a value from 0 to 100 where a LQM value of 100 indicates the best radio conditions, a LQM value of 50 indicates fair radio conditions, a LQM value of 20 indicates a minimally viable state (e.g., only perform operations that optimize a user experience), a LQM value of 10 indicates an abort state where only highly critical data is allowed to be exchanged (e.g., data that is initiated by the user), and a LQM value of 0 indicates a no service state.

It is noted that the use of a default LQM value and modifying this default LQM value with the offset is only exemplary. The exemplary embodiments are described with regard to an offset being determined by the companion UE 112 and the UE 110 determining the estimated initial LQM value. However, the companion UE 112 may be configured to determine the estimated initial LQM value and transmit this data instead. Furthermore, the use of the default LQM value and the offset is only exemplary and other mechanisms may be used by the exemplary embodiments in ultimately determining the data exchange mode to be used initially by the UE 110 upon entering the standalone mode.

Using the estimated initial LQM value, the offset engine 270 may determine the data exchange mode that is to be selected. For example, the UE 110 may utilize a normal mode or an abort mode. In the normal mode, the UE 110 may allow the applications running thereon to start using the network connection. In the abort mode, the UE 110 may only allow highly critical data to be exchanged. As noted above, one example of highly critical data may be data that is initiated by the user such as a request manually entered by the user into the UE 110. In contrast, a request by an application to update data as a background operation may not be performed. However, if the request to this particular update were a foreground operation (e.g., as entered by the user), this may be allowed. Accordingly, the offset engine 270 may utilize a LQM threshold. If the estimated initial LQM value is at least the LQM threshold, the normal mode may be selected. If the estimated initial LQM value is less than the LQM threshold, the abort mode may be selected. To correspond to LQM values, the LQM threshold may be, for example, set to 10.

It is noted that the offset engine 270 using a single LQM threshold and that the LQM threshold being set to 10 are only exemplary implementations. In a first example, the LQM threshold may utilize a higher standard and be set to 20 or even higher. Thus, the initial estimated LQM value may be required to be greater than this higher standard LQM threshold to select the normal mode while any initial estimated LQM value not satisfying this threshold results in selecting the abort mode. In a second example, the offset engine 270 may utilize a plurality of LQM thresholds. In a particular example, the offset engine 270 may use LQM thresholds corresponding to the above noted divisions in the LQM value range (e.g., 100, 50, 20, 10, 0). Depending on which sub-range that the initial estimated LQM value falls, the offset engine 270 may select a corresponding data exchange mode. For example, if the initial estimated LQM value is 5, the abort mode may be selected and only highly critical data may be exchanged. In another example, if the initial estimated LQM value is 30, an intermediary mode may be selected. The intermediary mode may be an activity mode between abort mode and normal mode that selectively prevents certain data exchanges. Further intermediary modes may be available that apply more strict or more permissible restrictions on data exchanges.

It is also noted that there may be instances when the UE 110 has not received an offset from the companion UE 112 prior to entering the standalone mode. For example, the UE 110 may have just been activated and the companion UE 112 is unavailable. In another example, the UE 110 may have terminated the companion mode and entered the standalone mode prior to the offset being provided. Furthermore, any offset that the UE 110 may have stored in the CT module may have a timestamp or other expiry marker that indicates that the offset is not usable. The UE 110 may also be configured to remove any previous offset upon receiving a new offset or after a predetermined amount of time has elapsed. In the scenario where the offset is not available, the selection engine 270 may use a default setting. For example, the selection engine 270 may select the abort mode.

The mode engine 275 may utilize the output of the selection engine 270 and set the corresponding manner upon which applications are to perform data exchanges. Thus, if the mode engine 275 receives a selection of the normal mode, the mode engine 275 may configure the baseband processor and instruct the applications processor that the applications may use the network connection. If the mode engine 275 receives a selection of the abort mode, the mode engine 275 may instruct the applications processor that the applications may only use the network connection for highly critical data.

The exemplary embodiments provide a mechanism to compensate for the window when the UE 110 enters the standalone mode and a data exchange mode is selected in a blind manner. Instead of an unreliable approach where the data exchange mode is only selected with a default setting, the exemplary embodiments rely on a likely estimation of the radio conditions of the UE 110 upon entering the standalone mode. When using a LQM value to determine the radio conditions and select a data exchange mode, the UE 110 may use a short-range communication pathway used in a companion relationship with the companion UE 112 which has determined its own radio conditions. As the radio conditions of the UEs 110, 112 are likely to be substantially similar with an offset, the UE 110 may use an initial estimated LQM value based on the offset determined by the companion UE 112 which reflects the probable radio conditions being experienced by the UE 110 to select the appropriate data exchange mode.

Figure 3:
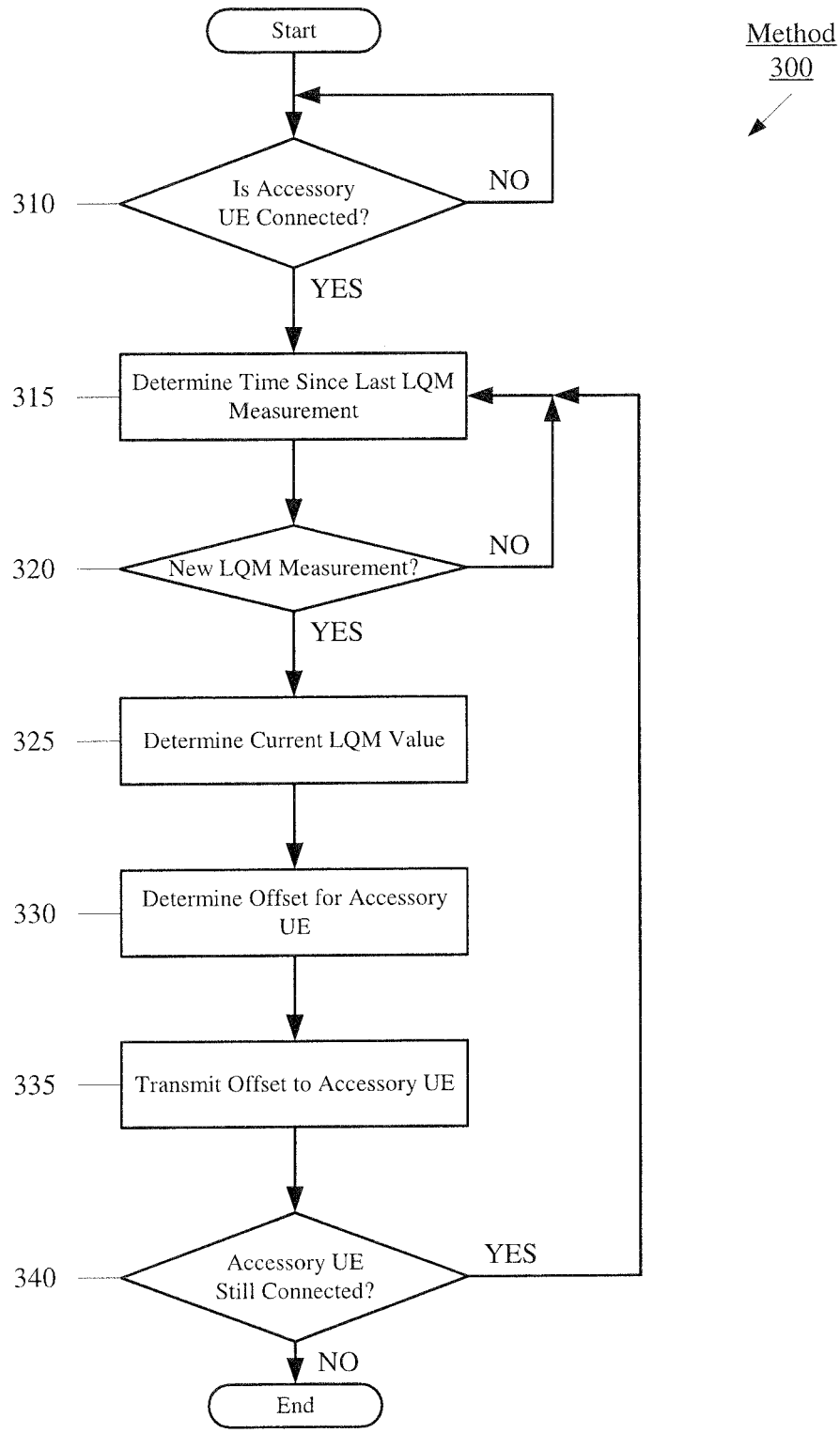
FIG. 3 shows an example method for determining how a mode in which network capabilities are initialized on an accessory UE is to be selected according to the various exemplary embodiments described herein.

FIG. 3 shows an example method 300 to determine how a mode in which network capabilities are initialized on an accessory UE is to be selected according to the various exemplary embodiments described herein. The method 300 will be described with reference to the UE 112 being a companion UE connected to the UE 110, where the UE 112 determines an offset to be used by the UE 110 based on the radio conditions being experienced by the UE 112. The method 300 may be performed by the measurement engine 220 and the offset engine 225 of the companion UE (e.g., UE 112). The method 300 will be described with regard to the network arrangement 100 of FIG. 1 and the UEs 110, 112 of FIG. 2.

In 310, the UE 112 determines whether the accessory UE 110 is connected over the short-range communication pathway. If the UE 110 is not connected, the UE 112 continues monitoring for the companion relationship. If the UE 110 is connected, the UE 112 continues to 315 where a time since a last LQM measurement is determined. As described above, the LQM value may be a network metric that is being measured by the UE 112 based on its network connection whether or not the exemplary embodiments are implemented. Thus, in 315, performing the LQM measurement may be set to an independent timer for purposes of updating the UE 110.

In 320, the UE 112 determines if a new LQM measurement is to be performed and a new LQM value is to be determined. If a new LQM measurement is not to be performed, the UE 112 returns to 315 to continue monitoring the timing of LQM measurements while the UE 110 remains connected in the companion mode. If a new LQM measurement is to be performed, the UE 112 continues to 325 where the current LQM value is determined based on data exchanges performed in a time window relative to a current time.

In 330, the UE 112 determines an offset that is to be provided to the UE 110. As described above, the offset may be determined based on a dynamic formula where the LQM value of the UE 112 provides an input as a variable in the formula. The formula may be selected with constants and multipliers based on the relationship of the UEs 110, 112 such as the short-range communication pathway, capability information, etc. Thus, in 335, the UE 112 transmits the offset to the UE 110 over the short-range communication pathway.

In 340, the UE 112 determines if the UE 110 is still connected thereto over the short-range communication pathway. If the UE 110 is still connected, the UE 112 returns to 315 where new LQM values are provided whenever applicable. If the UE 110 is disconnected, the UE 112 may resume operations being performed without the features of the measurement engine 220 and the offset engine 225.

Figure 4:
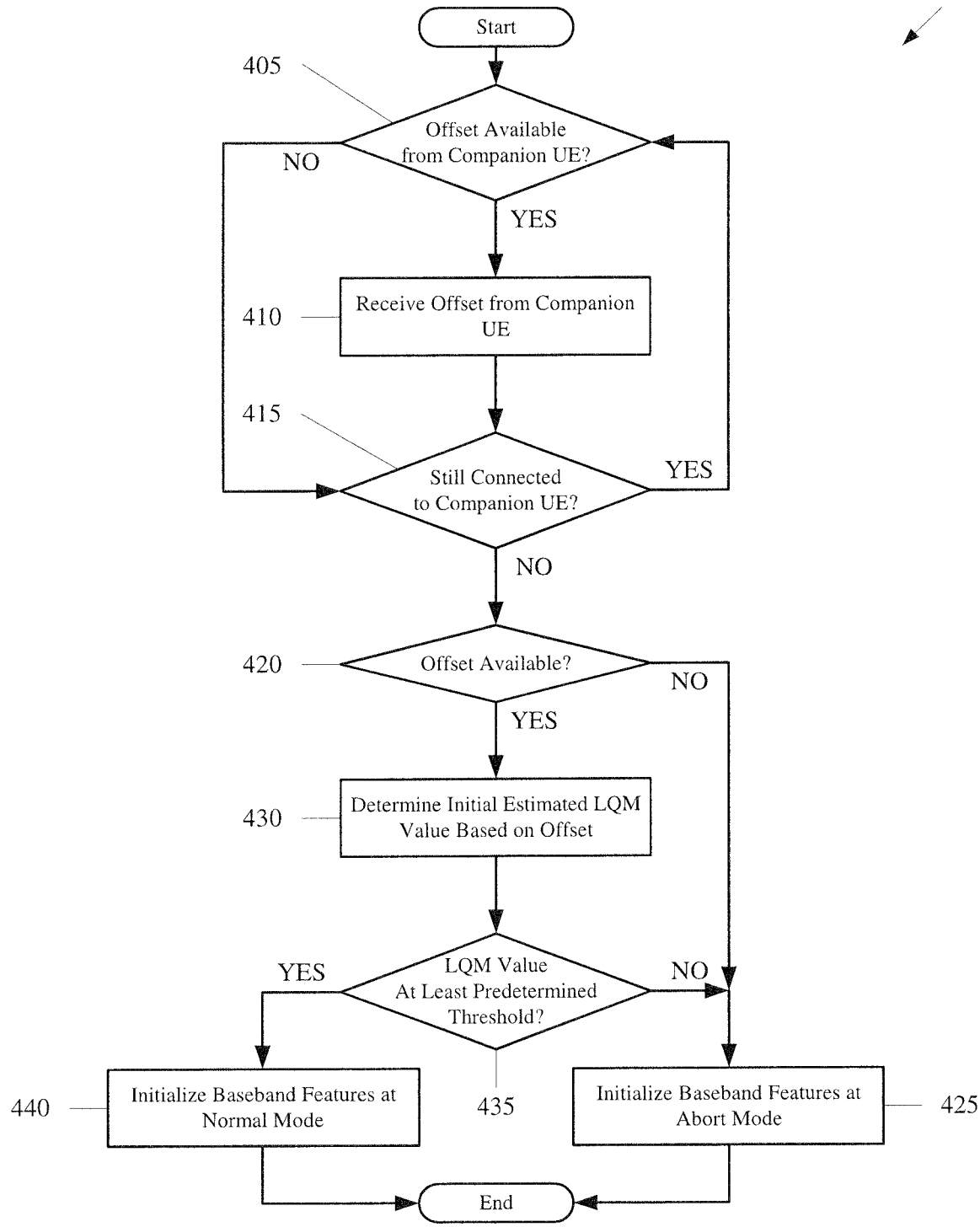
FIG. 4 shows an example method for selecting a mode in which network capabilities are initialized on an accessory UE according to the various exemplary embodiments described herein.

FIG. 4 shows an example method 400 to select a mode in which network capabilities are initialized on an accessory UE according to the various exemplary embodiments described herein. Specifically, the UE 110 may have received an offset from the companion UE 112 which, when applied, provides an initial estimated LQM value that forms the basis of selecting a data exchange mode. The method 400 may be performed by the selection engine 270 and the mode engine 275 of the accessory UE (e.g., UE 110). The method 400 will be described with regard to the network arrangement 100 of FIG. 1 and the UEs 110, 112 of FIG. 2.

In 405, the UE 110 determines whether an offset is available from the companion UE 112. When the offset is not available from the companion UE 112 to which the UE 110 may be currently connected over the short-range communication pathway, the UE 110 continues to 415. In 415, the UE 110 determines whether the UE 110 is still connected to the companion UE 112. If the UE 110 is still connected, the UE 110 returns to 405 to continue monitoring for offsets from the companion UE 112. However, if there is an offset available from the companion UE 112, in 410, the UE 110 receives the offset from the companion UE 112 over the short-range communication pathway. Thereafter, the UE 112 continues to 415.

In 415, the UE 110 determines if the UE 110 is still connected to the companion UE 112 over the short-range communication pathway. If the UE 110 is still connected, the UE 110 returns to 405 to continue monitoring for further offsets that may become available from the UE 112. However, if the UE 110 is no longer connected, the UE 110 continues to 420 where the UE 110 determines if an offset if available. Specifically, the UE 110 may check the CT module and determine if a usable offset is stored therein. As noted above, the offset may be usable if stored in the CT module and has been received within a predetermined usable time frame. If no offset is available, the UE 110 continues to 425 where the baseband features are initialized in abort mode and the applications running on the UE 110 are only allowed to use the network connection for highly critical data.

If an offset is available in 420, the UE 110 continues to 430. In 430, the UE 110 determines an initial estimated LQM value based on the offset. As noted above, one mechanism that may be used is to modify a default LQM value with the offset to arrive at the initial estimated LQM value. In 435, the UE 110 determines whether the initial estimated LQM value is at least a predetermined threshold. For example, the predetermined threshold may be set to 10 which corresponds to the abort mode. If the initial estimated LQM value is less than the predetermined threshold, the UE 110 continues to 425 where the baseband features are initialized in the abort mode. If the initial estimated LQM value is at least the predetermined threshold, the UE 110 continues to 440 where the baseband features are initialized in a normal mode. As noted above, the normal mode may relate to the applications running on the UE 110 to be allowed to use the network connection for different types of data including data that is not highly critical.

It is noted that the operations described for the method 400 are only exemplary. As noted above, the UE 110 may be configured with a plurality of predetermined thresholds with corresponding data exchange modes. Thus, the method 400 may be modified to identify in which sub-range of LQM values the initial estimated LQM value falls to then determine the corresponding data exchange mode. For example, as the extremes of the LQM sub-ranges become smaller, the restrictions on the data exchanges that are allowed may become more strict until reaching the abort mode.

The exemplary embodiments provide a device, system, and method of selecting a data exchange mode during the time frame when a UE enters an standalone mode. When entering the standalone mode where baseband features are initialized, the exemplary embodiments provide an initial estimated network metric that is used in determining the data exchange mode. The initial estimated network metric may be determined based on an offset that is determined by a companion UE. The offset may be determined based on radio conditions of the companion UE, a connection quality between the UE and the companion UE, and/or capability information of the UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
   at a first device that is configured to establish a device connection to a second device over a first connection and a network connection to a network over a second connection, the second device configured to establish a further network connection to the network over a third connection:
   receiving initiating data from the second device over the first connection, the initiating data based on radio conditions associated with the third connection of the second device;
   when the first device disconnects from the second device and establishes the second connection, determining an initial network metric value based on the initiating data, the initial network metric value used to estimate radio conditions associated with the second connection of the first device; and
   selecting a data exchange mode of the first device based on the initial network metric value, the selected data exchange mode being used until a further network metric is determined by the first device.

2. The method of claim 1, wherein the initial network metric value is one of a link quality metric (LQM) value, a received signal strength indicator (RSSI), a reference signal received quality (RSRQ), a reference signal received power (RSRP), a signal to noise ratio (SNR), a power attenuation, a power headroom, or a combination thereof.

3. The method of claim 2, wherein the initiating data is an offset applied to a default network metric value.

4. The method of claim 3, wherein the offset is determined based on a network metric value associated with the radio conditions associated with the third connection of the second device.

5. The method of claim 4, wherein the offset is further determined based on one of a quality of the first connection, capability information of the first device, a frequency, an antenna attenuation, or a combination thereof.

6. The method of claim 1, wherein the receiving the initiating data is performed one of at predetermined intervals, when a network related event is triggered, when the first connection is established, or a combination thereof.

7. The method of claim 1, wherein the data exchange mode is one of a normal mode or an abort mode, the normal mode enabling applications running on the first device to use the second connection, the abort mode restricting the applications to use the second connection only for highly critical data.

8. The method of claim 7, further comprising:
   comparing the initial network metric value to a predetermined threshold value,
   wherein, when the initial network metric is at least the predetermined threshold value, the normal mode is selected,
   wherein, when the initial network metric is less than the predetermined threshold value, the abort mode is selected.

9. The method of claim 8, wherein, when the initial network metric value is the LQM value, the predetermined threshold value is set to 10.

10. The method of claim 1, further comprising:
    storing the initiating data in a code telephony (CT) module of the first device.

11. A device, comprising:
    a transceiver configured to establish a device connection to a further device over a first connection and a network connection to a network over a second connection, the further device configured to establish a further network connection to the network over a third connection, the transceiver configured to receive initiating data from the second device over the first connection, the initiating data based on radio conditions associated with the third connection of the further device; and
    a processor determining an initial network metric value based on the initiating data when the device disconnects from the further device and establishes the second connection, the initial network metric value used to estimate radio conditions associated with the second connection of the device, the processor selecting a data exchange mode of the device based on the initial network metric value, the selected data exchange mode being used until a further network metric is determined by the device.

12. The device of claim 11, wherein the initial network metric value is one of a link quality metric (LQM) value, a received signal strength indicator (RSSI), a reference signal received quality (RSRQ), a reference signal received power (RSRP), a signal to noise ratio (SNR), a power attenuation, a power headroom, or a combination thereof.

13. The device of claim 12, wherein the initiating data is an offset applied to a default network metric value.

14. The device of claim 13, wherein the offset is determined based on a network metric value associated with the radio conditions associated with the third connection of the further device.

15. The device of claim 14, wherein the offset is further determined based on one of a quality of the first connection, capability information of the first device, a frequency, an antenna attenuation, or a combination thereof.

16. The device of claim 11, wherein the receiving the initiating data is performed one of at predetermined intervals, when a network related event is triggered, when the first connection is established, or a combination thereof.

17. The device of claim 11, wherein the data exchange mode is one of a normal mode or an abort mode, the normal mode enabling applications running on the device to use the second connection, the abort mode restricting the applications to use the second connection only for highly critical data.

18. The device of claim 17, wherein the processor compares the initial network metric value to a predetermined threshold value, when the initial network metric is at least the predetermined threshold value, the normal mode is selected, when the initial network metric is less than the predetermined threshold value, the abort mode is selected.

19. The device of claim 18, wherein, when the initial network metric value is the LQM value, the predetermined threshold value is set to 10.

20. A method, comprising:
- at a first device that is configured to establish a device connection to a second device over a first connection and a network connection to a network over a second connection, the second device configured to establish a further network connection to the network over a third connection:
- determining radio conditions associated with the second connection of the first device;
- determining a quality of the first connection;
- determining initiating data based on the radio conditions and the quality; and
- transmitting the initiating data to the second device over the first connection,
- wherein the initiating data is used by the second device upon disconnecting from the first device and establishing the second connection, the initiating data used to select a data exchange mode of the second device until a further network metric is determined by the second device.

21. The method of claim 20, wherein the initiating data is further determined based on one of a capability information of the second device, a frequency, an antenna attenuation, or a combination thereof.

22. The method of claim 20, wherein the transmitting the initiating data is performed one of at predetermined intervals, when a network related event is triggered, when the first connection is established, or a combination thereof.

* * * * *